United States Patent
Stoloff

(10) Patent No.: US 9,963,307 B2
(45) Date of Patent: May 8, 2018

(54) CONTAINER LIFTING AND POSITIONING SUPPORT

(71) Applicant: Phillip Stoloff, Carbondale, CO (US)

(72) Inventor: Phillip Stoloff, Carbondale, CO (US)

( * ) Notice: Subject to any disclaimer, the term of this patent is extended or adjusted under 35 U.S.C. 154(b) by 328 days.

(21) Appl. No.: 14/797,228

(22) Filed: Jul. 13, 2015

(65) Prior Publication Data

US 2017/0015509 A1    Jan. 19, 2017

(51) Int. Cl.
*B65G 65/23* (2006.01)
*B67D 7/84* (2010.01)

(52) U.S. Cl.
CPC ............. *B65G 65/23* (2013.01); *B67D 7/845* (2013.01)

(58) Field of Classification Search
CPC ................................. B67D 7/845; B65G 65/23
See application file for complete search history.

(56) References Cited

U.S. PATENT DOCUMENTS

| | | |
|---|---|---|
| 996,658 A | 7/1911 | Minor |
| 1,299,296 A | 4/1919 | Bye |
| 1,839,528 A | 5/1932 | Benoit |
| 2,670,864 A | 2/1954 | Hought |
| 3,863,985 A * | 2/1975 | Zuber ........................ B62B 3/02 298/11 |
| 3,889,778 A | 6/1975 | Dotts |
| 3,998,491 A * | 12/1976 | Diem ........................ B60P 1/34 298/11 |
| 4,084,706 A * | 4/1978 | Russell .................... B62B 3/104 212/901 |
| 5,205,699 A * | 4/1993 | Habicht .................. B65G 65/23 187/229 |
| 5,454,625 A * | 10/1995 | Christensen .............. B62B 3/08 187/244 |
| 5,551,558 A | 9/1996 | Bureau |
| 5,888,043 A | 3/1999 | Jatcko |
| 6,379,034 B1 * | 4/2002 | Schutz .................... B65G 65/23 222/166 |
| 6,644,907 B1 * | 11/2003 | Pinder .................... B65G 65/23 414/424 |
| 7,140,055 B2 | 11/2006 | Bishop |
| 7,344,112 B2 * | 3/2008 | Nice ...................... B67D 7/845 248/125.1 |
| 7,413,056 B2 | 8/2008 | Gonzi |
| 7,717,263 B2 | 5/2010 | Evans |
| 8,550,475 B2 * | 10/2013 | Chauza .................... B62B 1/16 280/47.19 |
| 8,979,059 B2 | 3/2015 | Greenwood |
| 2005/0263542 A1 | 1/2005 | Brezden |
| 2014/0076938 A1 | 3/2014 | Bonner |

FOREIGN PATENT DOCUMENTS

WO    WO 2007 079577    7/2007

* cited by examiner

*Primary Examiner* — Jonathan Snelting
(74) *Attorney, Agent, or Firm* — Craige Thompson; Thompson Patent Law

(57) ABSTRACT

Apparatus and associated methods relate to a user height adjustable container support system having an elevated upper base, where the upper base is designed to receive and hingedly couple to a container so that a user may tilt the container while the upper base supports the container.

18 Claims, 5 Drawing Sheets

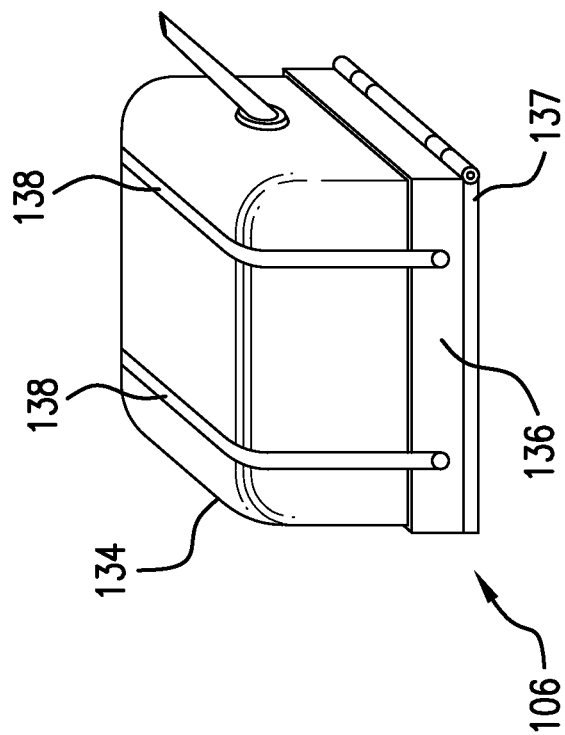
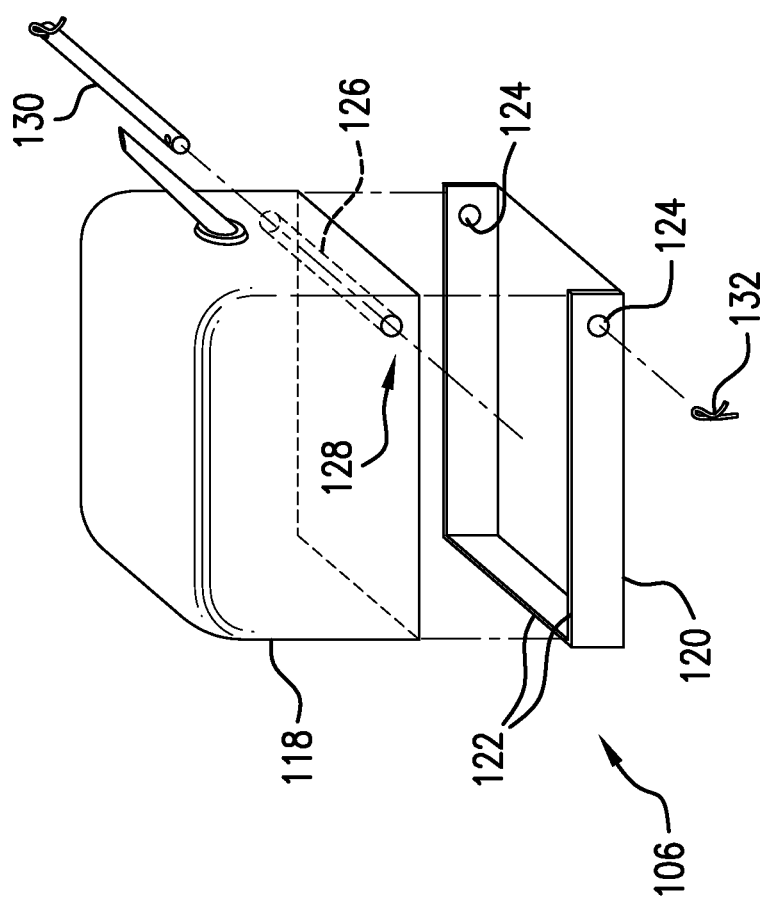

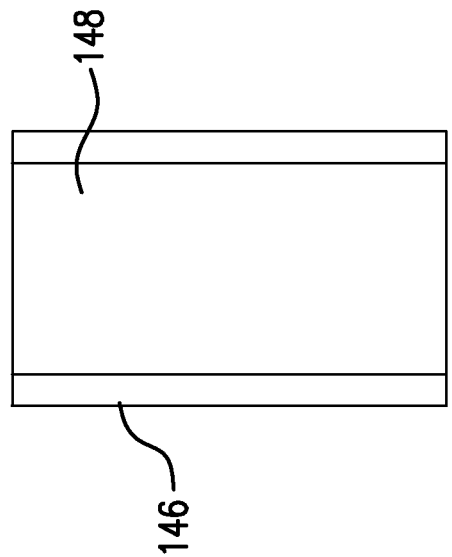
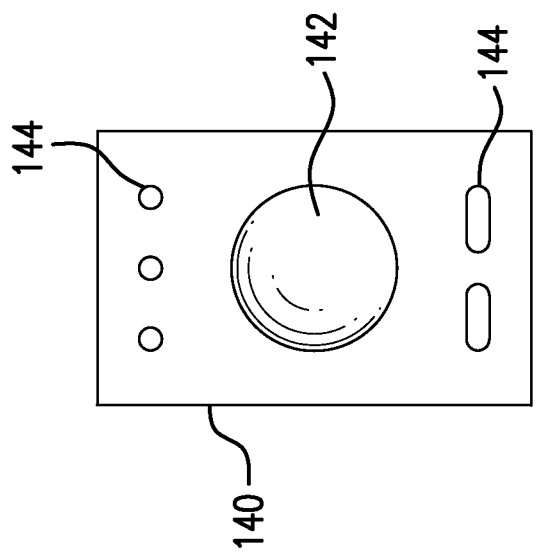
FIG. 4A
FIG. 4B

CONTAINER LIFTING AND POSITIONING SUPPORT

TECHNICAL FIELD

Various embodiments relate generally to lifting and positioning supports for liquid fuel containers.

BACKGROUND

Portable fuel containers are usually found in garages, sheds, and anywhere else that vehicles or gasoline-powered devices may be stored. If a vehicle or equipment runs out of fuel, a person may retrieve their gas can, lift the can up to the fuel tank opening, and tilt the can to pour the gasoline into the vehicle.

Liquid fuel containers may be heavy, bulky, or otherwise difficult to maneuver and hold in position. Some people may not be able to hold the fuel container long enough or high enough or may just need to fill multiple vehicles with fuel.

SUMMARY

Apparatus and associated methods relate to a user height adjustable container support system having an elevated upper base, where the upper base is designed to receive and hingedly couple to a container so that a user may tilt the container while the upper base supports the container.

In an illustrative example, the apparatus may include a base, vertical lifting member, and an upper support. A gasoline container may be secured to the apparatus via a hinged connection. The container may either be custom with an integrally formed hinge tunnel or a standard commercially available fluid container. A foot pedal and locking mechanism may connect to the vertical lifting member. To use the apparatus to fuel a vehicle, the foot pedal may be selectively actuated to engage/disengage the height locking mechanism. The container is lifted to a desired height and the foot pedal is released to re-engage the locking mechanism and keep the container elevated. The container is then pivoted forward to pour gasoline into the vehicle. When completed, the container is pivoted back to a level position and kept at that height or lowered via the foot pedal.

Various embodiments may provide certain advantages. For example, a lifting and positioning apparatus may be easily deployed from a stowed mode to a support mode to ease the task of lifting and tilting an object, such as a gasoline container by supporting the object in such a position for an extended period of time. The apparatus may be lightweight and compactable for stowage. Various embodiments may have multiple purposes other than supporting the lift and tilt operations of a fluid container. Exemplary purposes may include, by way of example and not limitation, a user height adjustable portable work surface, or a height adjustable shelf for a paint tray or can, or for individual tools or a tool box, for example.

The details of various embodiments are set forth in the accompanying drawings and the description below. Other features and advantages will be apparent from the description and drawings, and from the claims.

BRIEF DESCRIPTION OF THE DRAWINGS

FIG. 2 is a partially exploded perspective view depicting an exemplary upper support of the lifting and positioning apparatus of FIG. 1 with a liquid container having an integral pivot tunnel.

FIG. 3 is a perspective view depicting an exemplary upper support of the lifting and positioning apparatus with a commercially available liquid container.

FIGS. 4A and 4B are top views of exemplary custom upper supports for a lifting and positioning apparatus.

Like reference symbols in the various drawings indicate like elements.

DETAILED DESCRIPTION OF ILLUSTRATIVE EMBODIMENTS

Figure 1:
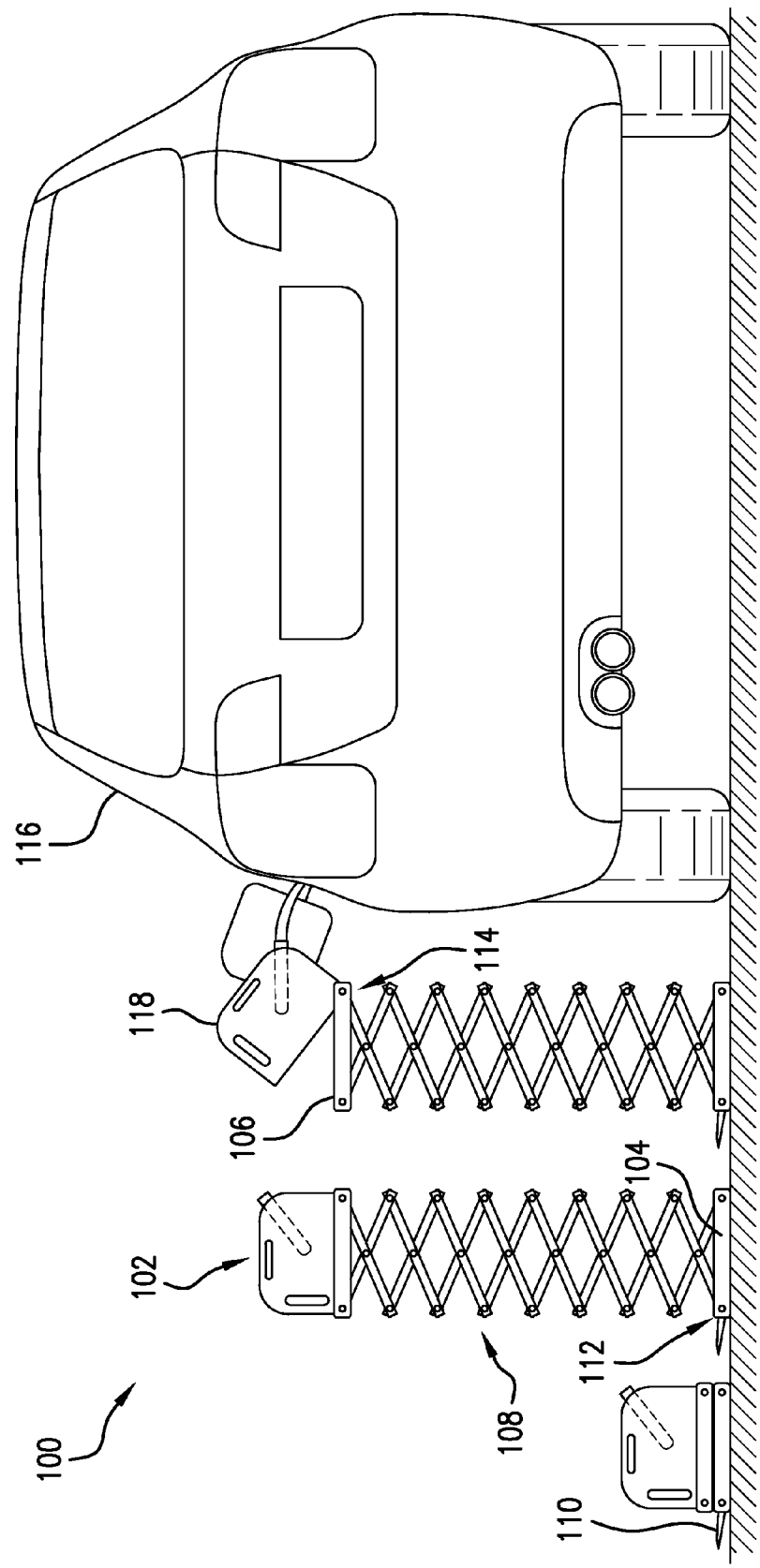
FIG. 1 depicts side views of an exemplary container lifting and positioning apparatus in various stages of use.

FIG. 1 depicts side views of an exemplary container lifting and positioning assistance apparatus 100 in various stages of use. The apparatus 100 provides lift-and-rotate assistance with a number of features that enable a user to easily raise, lower, and tip an object, such as when transferring liquid fuel from a container 102 of gasoline. The apparatus 100 includes a base unit 104 and an upper support 106 connected by a vertical lift member 108 operably connected to a foot pedal 110. The container 102 is received by and secured to the apparatus 100 as discussed in greater detail regarding FIGS. 2 and 3. A locking mechanism 112 is provided to hold the upper support 106 and container 102 in an elevated position. The apparatus 100 includes a hinged mechanism 114 connected to the container 102 providing pivotable movement. The apparatus 100 is used to help lift the container 102 to a desired height. The container 102 is then tipped forward to pour gasoline into a gas tank of an automobile 116 or other gas-powered equipment. After pouring is complete, the container 102 is returned to a level position and either left in a raised or returned to a lowered position.

FIG. 2 is a partially exploded perspective view depicting an exemplary upper support 106 of the lifting and positioning apparatus of FIG. 1 with a custom-made liquid container 118 having an integral pivot tunnel. The support unit 106 is formed as a tray 120 that is substantially rectangular and generally flat in shape for stable placement and support of the container 118 in a level position. The tray 120 has low sides 122 extending upwardly to cradle the container 118. The sides 122 include a series of axially-aligned holes 124 formed therein. The container 118 has an integrally formed tunnel 126 located in a lower front corner 128 that extends through the entire width of the container 118. A bolt 130 extends through the holes 124 and the tunnel 126 and secured in place with a cotter pin 132 to form a hinged connection between the container 118 and the support tray 106. Angular movement of the container 118 is limited to pivoting from the level position to a forward tipped, or pouring, position.

FIG. 3 is a perspective view depicting an exemplary upper support 106 of FIG. 1 with a commercially available gasoline container 134. The apparatus 100 includes a tray 136 with a hinge 137 to pivotally connect the container 134 to the upper support 106. The tray 136, or container platform, is configured to support a substantially planar bottom surface of a fluid-filled container at a user-selected elevation above a ground surface. The hinged tray 136 includes straps 138 to securely couple the container 134 to the upper support 106. The straps 138 are adjustable such that a container 134 may be securely connected to the apparatus 100 regardless of the size or shape. The upper support 106 includes a cradle hingedly coupled to the container platform to pivot about a hinge axis. The cradle is configured to support the container platform such that when the container is placed on a top surface of the container platform, the container platform supports the container in a substantially horizontal position in a support mode at one extreme of a range of motion about the hinge axis. The cradle maintains its orientation as a user causes the container platform to pivot about the hinge axis in a pour mode to pour fuel from the container 134.

FIGS. 4A and 4B are top views of exemplary custom upper supports for a lifting and positioning apparatus. FIG. 4A depicts a first exemplary custom upper support 140. The support 140 is molded to include a recessed portion 142 to receive an item with a rounded footprint such as a can of paint or a bucket. Slots 144 are also formed in the support 140 to hold accessories such as paint brushes or other tools. FIG. 4B depicts a second custom upper support 146 having a recessed portion 148 shaped to receive and secure a toolbox. The lifting and positioning apparatus 100 with custom upper supports provide increased positioning flexibility for a variety of objects.

Figure 5:
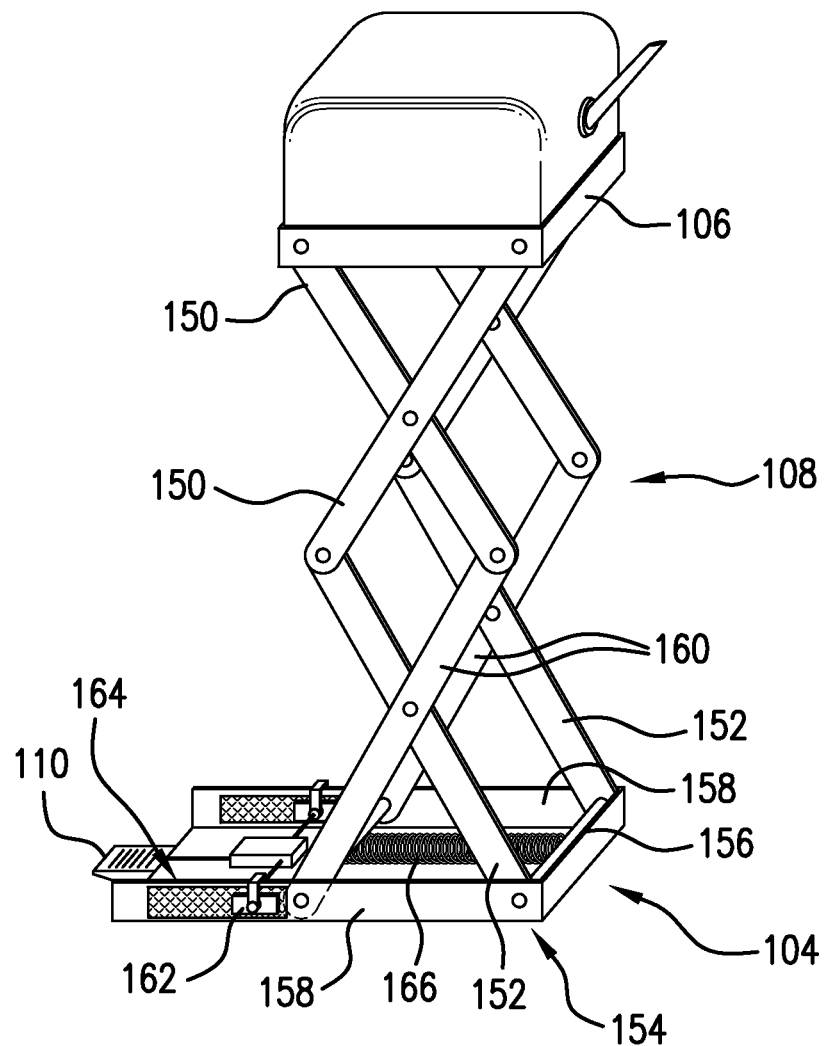
FIG. 5 is a perspective view of an exemplary lifting and positioning apparatus including the base and vertical lift member.

FIG. 5 is a perspective view of an exemplary lifting and positioning apparatus including the base 104 and vertical lift member 108 that provide exemplary structure for vertically supporting the cradle at the user selected elevation above the ground surface. The vertical lift member 108 includes a series of ratcheting scissor legs 150. Front lower legs 152 are rotatably connected to a front end 154 of the base 104 with a horizontal rod 156. Front rod 156 extends through side walls 158 of the base 104 and the legs 152 to enable rotational movement of the front lower legs 152 when the upper support 106 is raised or lowered. FIG. 5 depicts an embodiment of a locking mechanism that provides exemplary structure for selectively locking the cradle at the user-selected elevation. The lift member 108, or vertical support module, is coupled to the base 104 and extending in an upward direction. The vertical support module is configured to attach to and support the cradle at the user-selected elevation above the ground surface. Rear lower legs 160 are slidably coupled to the base 104, wherein the foot of each of the rear lower legs 160 is able to slide along a corresponding one of the side walls 158.

The user may control the height of the cradle 106 by operating a locking mechanism 162, such as a caliper-style brake, for example, releasable engaged with a roughened section 164 of the side wall 158. The roughened section 164 may have laterally extending surface features (e.g., small teeth, sawtooth, small punctures or deformations in the surface, or an abrasive surface) that provide a stronger gripping surface to enhance the grip of the braking system 162. In the depicted example, the roughened section 164 has roughened surfaces on both the inside and outside faces of the sides 158. When the foot pedal 110 is not depressed, the caliper 162 engages the roughened section 164 to lock the vertical lift member 108 in position by limiting the movement of the slidable foot of at least one of the legs 160 in a direction away from a foot of the stationary front lower leg 152. When the foot pedal 110 is depressed, the caliper 162 may displace the brake laterally to release engagement with the section 164 of the side 108 and the container 102 may be lifted or lowered to a desired height, or collapsed into a stowage mode.

In some embodiments, the foot pedal 110 may control releasable engagement of a locking mechanism that, when engaged, limits or constrains movement of the base of the lower leg 160 to set the user-adjustable height of the cradle or the upper support 106. In various embodiments, the locking mechanism may be configured to releasably engage a vertically oriented wall extending vertically up from the upper surface of the base 104. In some examples, the vertical wall engaged by the locking mechanism may be formed in between the side walls 158, such as along a centerline of the base 104 equally spaced between side walls 158.

In some examples, the foot pedal 110 may control releasable engagement of a locking mechanism with a roughened surface formed on the upper surface of the base 104. When the foot pedal 110 is depressed, the caliper 162 may displace the brake vertically to release engagement of the locking mechanism from the roughened surface.

In some embodiments, the locking mechanism may include a hook that engages a sawtooth structure formed on the engagement surface. In various embodiments, the foot pedal 110 or other user control device may be operatively coupled, such as via a control cable or control rod, to control the engagement or disengagement of the locking mechanism with the engagement surface on the base 104.

In the depicted embodiment, a biasing element such as a spring 166 may be connected between the front and back lower legs 152, 160 to provide a counterweight effect by decreasing the amount of force needed to lift the container 102. The legs 150 may be formed of a lightweight rigid material such as plastic or aluminum to minimize the weight of the apparatus 100 and further reduce the amount of force needed to lift the container 102. The overall size and weight of the apparatus 100 may be small enough to be conveniently stored in the trunk of an automobile and easily transported.

Figure 6:
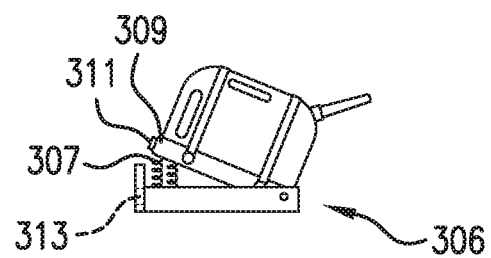
FIG. 6 is a side view of an exemplary upper support of the container lifting and positioning apparatus of FIG. 1 with a spring loaded hinge plate.

FIG. 6 shows an exemplary upper support 306 of the lifting and positioning apparatus 100 of FIG. 1. The upper support 306 includes a biasing element 307 connected to a hinge plate 309. The container 102 is held in a non-pouring position with a button 311 passing through a slot 313.

Although various embodiments have been described with reference to the figures, other embodiments are possible. For example, some embodiments may attach the container to the upper support with a threaded rod and fasteners or shorter bolts extending through separate tunnels formed in the container. A commercially-available container may be securely connected to the hinge component by, for example, magnets adhesively attached to the container. In some examples, hook and loop fastener pieces may secure the exterior of the container to the hinge plate.

Support legs attachable to the cradle may extend laterally and down to the ground provide added stability. Some support legs may have adjustable length to accommodate uneven terrain.

In some implementations, one or more additional foot pedals may be provided to release a latch for tilting the container or for raising the vertical lift member. Wheels or other means to move the positioning and lifting assistance apparatus may be provided.

In various examples, the upper container support may be collapsed for stowage adjacent the base. In some scissor-type embodiments, the vertical module may extend for use, and then retract to a collapsed mode for low profile storage.

A number of implementations have been described. Nevertheless, it will be understood that various modification may be made. Accordingly, other implementations are contemplated to be within the scope of the following claims.

What is claimed is:

1. A lift-and-rotate assistance apparatus for use while transferring liquid fuel from a fuel container to a vehicle fuel tank, the apparatus comprising:
 a container platform configured to support a substantially planar bottom surface of a fluid-filled container at a user-selected elevation above a ground surface;
 a cradle hingedly coupled to the container platform to pivot about a hinge axis, and configured to support the container platform such that, when the container is placed on a top surface of the container platform, the container platform supports the container in a substantially horizontal position in a support mode at one extreme of a range of motion about the hinge axis, and wherein the cradle maintains its orientation as a user causes the container platform to pivot about the hinge axis in a pour mode to pour fuel from the container;
 a lower support base to make contact with a ground surface;
 a vertical support module coupled to and extending upward from the base and configured to attach to and support the cradle at the user-selected elevation above the ground surface, wherein the vertical support module comprises a ratcheting scissor-style lift comprising a plurality of interconnected scissors stages extending between a base end coupled to the lower base and a user-height adjustable end coupled to the cradle, and wherein the base end of the interconnected scissors stages comprises a first member hingedly coupled to the base; and,
 means for selectively locking the cradle at the user-selected elevation.

2. The apparatus of claim 1, wherein the base end of the interconnected scissors stages comprises a second member that intersects the first member, wherein the second member selectively fixes to a position on the base corresponding to the container platform at the user-selected elevation above the ground surface by operation of the selective locking means.

3. The apparatus of claim 2, wherein the selective locking means comprises a foot pedal operable by the user to lock in the container platform at the user-selected elevation above the ground surface.

4. The apparatus of claim 3, wherein the selective locking means comprises a caliper-style brake that locks the second member relative to the base when the user releases the actuator to lock the elevation of the container platform above the ground surface, and that releases the second member to move relative to the base when the user engages the actuator to adjust the elevation of the container platform above the ground surface.

5. The apparatus of claim 1, further comprising an attachment wherein the container releasably couples to the container platform by at least one of a member of the group consisting of: strap, buckle, hook and loop fastener, magnet, or adhesive.

6. The apparatus of claim 1, further comprising a foot pedal operably connected to the selective locking means and operable by the user to lock the container platform at the user-selected elevation above the ground surface.

7. A lift-and-rotate assistance apparatus for use while transferring liquid fuel from a fuel container to a vehicle fuel tank, the apparatus comprising:
 a container platform configured to support a substantially planar bottom surface of a fluid-filled container at a user-selected elevation above a ground surface;
 a cradle hingedly coupled to the container platform to pivot about a hinge axis, and configured to support the container platform such that, when the container is placed on a top surface of the container platform, the container platform supports the container in a substantially horizontal position in a support mode at one extreme of a range of motion about the hinge axis, and wherein the cradle maintains its orientation as a user causes the container platform to pivot about the hinge axis in a pour mode to pour fuel from the container;
 a lower support base to make contact with a ground surface;
 a vertical support module coupled to and extending upward from the base and configured to attach to and support the cradle at the user-selected elevation above the ground surface; and,
 means for selectively locking the cradle at the user-selected elevation.

8. The apparatus of claim 7, wherein the vertical support module comprises a pair of elongate rigid vertical support members, wherein the cradle attaches to the vertical support members at a user-selected elevation.

9. The apparatus of claim 8, wherein at least one of the vertical support members comprises a series of apertures, each of the apertures disposed at a different elevation above the base.

10. The apparatus of claim 9, wherein the selective locking means further comprises a spring lock attached to the cradle, the spring lock comprising a stopper and biased to maintain the stopper in a user-selected one of the apertures corresponding to the container platform at the user-selected elevation above the ground surface.

11. The apparatus of claim 9, wherein the pair of vertical support members releasably couple to and decouple from the base without the use of tools.

12. The apparatus of claim 9, wherein each one of the pair of vertical support members each comprises at least two segments that releasably couple end-to-end to form each of the elongate rigid vertical support members.

13. The apparatus of claim 7, further comprising an attachment wherein the container releasably couples to the container platform by at least one of a member of the group consisting of: strap, buckle, hook and loop fastener, magnet, or adhesive.

14. A lift-and-rotate assistance apparatus for use while transferring liquid fuel from a fuel container to a vehicle fuel tank, the apparatus comprising:
 a container platform configured to support a substantially planar bottom surface of a fluid-filled container at a user-selected elevation above a ground surface;
 a cradle hingedly coupled to the container platform to pivot about a hinge axis, and configured to support the container platform such that, when the container is placed on a top surface of the container platform, the container platform supports the container in a substantially horizontal position in a support mode at one extreme of a range of motion about the hinge axis, and wherein the cradle maintains its orientation as a user causes the container platform to pivot about the hinge axis in a pour mode to pour fuel from the container;
 a lower support base to make contact with a ground surface;
 means for vertically supporting the cradle at the user-selected elevation above the ground surface;
 means for selectively locking the cradle at the user-selected elevation.

15. The apparatus of claim 14, wherein the vertical support means comprises a pair of elongate rigid vertical support members, wherein the cradle attaches to the vertical support members at a user-selected elevation.

16. The apparatus of claim 15, wherein at least one of the vertical support members comprises a series of apertures, each of the apertures disposed at a different elevation above the base.

17. The apparatus of claim 16, wherein the selective locking means further comprises a spring lock attached to the cradle, the spring lock comprising a stopper and biased to maintain the stopper in a user-selected one of the apertures corresponding to the container platform at the user-selected elevation above the ground surface.

18. The apparatus of claim 14, wherein the vertical support means comprises a ratcheting scissor-style lift.

* * * * *